United States Patent
Jung et al.

(10) Patent No.: US 10,532,743 B2
(45) Date of Patent: Jan. 14, 2020

(54) METHOD FOR CONTROLLING MOTOR TORQUE IN ELECTRIC VEHICLE

(71) Applicants: HYUNDAI MOTOR COMPANY, Seoul (KR); KIA MOTORS CORPORATION, Seoul (KR)

(72) Inventors: Jae Won Jung, Seoul (KR); Jae Yeong Yoo, Yongin-si (KR); Seung Heon Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 150 days.

(21) Appl. No.: 15/813,468

(22) Filed: Nov. 15, 2017

(65) Prior Publication Data

US 2018/0170386 A1 Jun. 21, 2018

(30) Foreign Application Priority Data

Dec. 15, 2016 (KR) .......................... 10-2016-0171899

(51) Int. Cl.
*B60W 30/18* (2012.01)
*B60L 7/18* (2006.01)

(52) U.S. Cl.
CPC ......... *B60W 30/18127* (2013.01); *B60L 7/18* (2013.01); *B60W 2510/083* (2013.01); *B60W 2520/10* (2013.01); *B60W 2540/10* (2013.01); *B60W 2540/12* (2013.01)

(58) Field of Classification Search
None
See application file for complete search history.

(56) References Cited

U.S. PATENT DOCUMENTS

| | | | |
|---|---|---|---|
| 9,139,105 B2 | 9/2015 | Kim | |
| 9,327,709 B2* | 5/2016 | Wang | B60W 10/08 |
| 2010/0004809 A1* | 1/2010 | Itoh | B60K 6/445 |
| | | | 701/22 |
| 2013/0090799 A1* | 4/2013 | Nakamura | B60L 15/2063 |
| | | | 701/22 |
| 2014/0172211 A1 | 6/2014 | Kim | |
| 2017/0113700 A1* | 4/2017 | Kaneko | B60W 50/06 |
| 2018/0134298 A1* | 5/2018 | Johri | B60W 30/18063 |

FOREIGN PATENT DOCUMENTS

| | | |
|---|---|---|
| JP | H11-069508 A | 3/1999 |
| JP | 2007-060761 A | 3/2007 |
| JP | 2012-091581 A | 5/2012 |
| KR | 10-1221798 B1 | 1/2013 |
| KR | 10-1448755 B1 | 10/2014 |

* cited by examiner

*Primary Examiner* — Thomas G Black
*Assistant Examiner* — Demetra R Smith-Stewart
(74) *Attorney, Agent, or Firm* — Morgan, Lewis & Bockius LLP

(57) ABSTRACT

A method for controlling a motor torque in an electric vehicle, includes the steps of: (a) determining a driving condition of the vehicle; (b) determining whether or not a predetermined limiting condition for a creep torque increase rate is satisfied when it is determined that the vehicle is decelerating in step (a); and (c) limiting the creep torque increase rate when the limiting condition for a creep torque increase rate is satisfied, and applying a creep torque of which the increase rate has been limited.

14 Claims, 7 Drawing Sheets

METHOD FOR CONTROLLING MOTOR TORQUE IN ELECTRIC VEHICLE

CROSS-REFERENCE TO RELATED APPLICATION

This application is based on and claims the benefit of priority to Korean Patent Application No. 10-2016-0171899, filed on Dec. 15, 2016, in the Korean Intellectual Property Office, the disclosure of which is incorporated herein in its entirety by reference.

TECHNICAL FIELD

The present disclosure relates to a method for controlling a motor torque in an electric vehicle.

BACKGROUND

In recent years, research is being actively conducted on electric vehicles, such as hybrid vehicles, pure electric vehicles, and fuel cell vehicles, which can replace conventional internal combustion engine vehicles, due to high oil prices, regulations to limit carbon dioxide ($CO_2$) emissions, and the like. An electric vehicle uses a drive motor (an electric motor) as a power source, and a permanent magnet synchronous motor having high output and high efficiency, especially, an interior permanent magnet synchronous motor is usually used as the drive motor.

When braking is needed, the electric vehicle improves fuel efficiency through regenerative braking that converts kinetic energy into electrical energy. Thus, the distribution of a hydraulic braking torque using friction of a hydraulic braking system and a regenerative braking torque using a drive motor is essentially required.

A total braking torque required for normal braking may be divided as below. Here, normal braking is performed when regenerative braking energy is efficiently stored in a battery since an available storage space of the battery is sufficient.

Total Braking Torque=Total Hydraulic Braking Torque+Total Regenerative Braking Torque In addition, the total regenerative braking torque may be divided as below.

Total Regenerative Braking Torque=Regenerative Braking Torque Required+Coast Regenerative Braking Torque The regenerative braking torque required refers to a motor torque selectively applied only when a driver depresses a brake pedal, and the coast regenerative braking torque refers to a motor torque basically applied for vehicle driving comfort. In addition, as a motor torque basically applied for vehicle driving comfort, there is a creep torque.

FIG. 1 shows a graph illustrating a regenerative braking torque requirement curve, a creep torque curve, and a coast regenerative braking torque curve, in a method for controlling a motor torque in an electric vehicle according to the related art.

In FIG. 1, an X-axis represents a speed of a vehicle, a positive Y-axis represents a creep torque, a negative Y-axis represents a regenerative braking torque required, or a coast regenerative braking torque, an upward movement along the positive Y-axis represents an increase in creep torque, and a downward movement along the negative Y-axis represents an increase in regenerative braking torque required and coast regenerative braking torque.

As illustrated in FIG. 1, the required regenerative braking torque may be applied according to a predetermined regenerative braking torque requirement curve L1. According to the regenerative braking torque requirement curve L1, the required regenerative braking torque may be maintained to be a predetermined maximum regenerative braking torque T1 required, be reduced when the vehicle speed is equal to a predetermined vehicle speed V1 for reduction of the required regenerative braking torque, and be not applied when the vehicle speed is equal to a predetermined vehicle speed V2 for termination of regenerative braking torque requirement. Here, the vehicle speed V2 for termination of regenerative braking torque requirement is a vehicle speed when the required regenerative braking torque is equal to 0.

A creep torque is provided to allow a stationary vehicle with an accelerator pedal off to start forward or backward. When the stationary vehicle is in a state of a brake pedal off and the accelerator pedal off, the creep torque may allow the vehicle to slowly move forward or backward. This is called "creep driving".

Such a creep torque may be applied according to a predetermined creep torque curve L2, as illustrated in FIG. 1. According to the creep torque curve L2, the creep torque may be maintained to be a predetermined maximum creep torque T2, be reduced when the vehicle speed is equal to a predetermined vehicle speed V3 for reduction of the creep torque, and be not applied when the vehicle speed is equal to a predetermined vehicle speed V4 for termination of creep driving. Here, the vehicle speed V4 for termination of creep driving is a vehicle speed when the creep torque is equal to 0.

The coast regenerative braking torque is provided to allow the vehicle with the accelerator pedal off to decelerate just as an internal combustion engine (ICE) works. When the vehicle speed is higher than a predetermined vehicle speed V6 for termination of coast regenerative braking in a state of the brake pedal off and the accelerator pedal off, the vehicle speed may be gradually reduced. This is called "coast driving".

The coast regenerative braking torque may be applied according to a predetermined coast regenerative braking torque curve L3, as illustrated in FIG. 1. According to the coast regenerative braking torque curve L3, the coast regenerative braking torque may be maintained to be a predetermined maximum coast regenerative braking torque T3, be reduced when the vehicle speed is equal to a predetermined vehicle speed V5 for reduction of the coast regenerative braking torque, and be not applied when the vehicle speed is equal to the predetermined vehicle speed V6 for termination of coast regenerative braking. Here, the vehicle speed V6 for termination of coast regenerative braking is a vehicle speed when the coast regenerative braking torque is equal to 0.

FIG. 2 shows a graph illustrating a motor torque curve when braking a vehicle, in a method for controlling a motor torque in an electric vehicle according to the related art.

In FIG. 2, an X-axis represents a speed of a vehicle, a positive Y-axis represents a creep torque, a positive motor torque, or a negative Y-axis represents a regenerative braking torque required, a coast regenerative braking torque, or a negative motor torque, an upward movement along the positive Y-axis represents an increase in creep torque and positive motor torque, and a downward movement along the negative Y-axis represents an increase in regenerative braking torque required, coast regenerative braking torque, and negative motor torque.

As the vehicle speed V2 for termination of regenerative braking torque requirement is decreased, regenerative braking energy may be increased, and thus fuel efficiency may be improved. Thus, as illustrated in FIG. 1, there is a section in which the vehicle speed V2 for termination of regenerative braking torque requirement is lower than the vehicle speed V4 for termination of creep driving. Then, an overlapping region in which a positive torque command and a negative torque command coexist may appear in a section between the vehicle speed V2 for termination of regenerative braking torque requirement and the vehicle speed V4 for termination of creep driving.

In general, when such an overlapping region is generated, the regenerative braking torque requirement may be prioritized for safety. As illustrated in FIG. 2, when the vehicle is braked, if the vehicle speed is between the vehicle speed V2 for termination of regenerative braking torque requirement and the vehicle speed V4 for termination of creep driving, the negative motor torque corresponding to the required regenerative braking torque may be output, and if the vehicle speed is lower than the vehicle speed V2 for termination of regenerative braking torque requirement, the positive motor torque corresponding to the creep torque may be output. In other words, there is a section in which the motor torque is suddenly changed from negative torque to positive torque on the basis of the vehicle speed V2 for termination of regenerative braking torque requirement. Thus, due to a sudden change of the motor torque occurring when the required regenerative braking torque is changed to the creep torque in the conventional method for controlling a motor torque in an electric vehicle, a shock may occur in a drive system of the vehicle, causing a reduction in ride comfort.

Meanwhile, as illustrated in FIG. 1, the vehicle speed V5 for reduction of the coast regenerative braking torque and the vehicle speed V6 for termination of coast regenerative braking may be higher than the vehicle speed V1 for reduction of the required regenerative braking torque and the vehicle speed V2 for termination of regenerative braking torque requirement. In other words, the vehicle speed V5 for reduction of the coast regenerative braking torque and the vehicle speed V6 for termination of coast regenerative braking differ from the vehicle speed V1 for reduction of the required regenerative braking torque and the vehicle speed V2 for termination of regenerative braking torque requirement. Thus, as illustrated in FIG. 2, inflection points P1 and P2 appear at particular points of the motor torque curve L3 corresponding to the vehicle speed V5 for reduction of the coast regenerative braking torque and the vehicle speed V6 for termination of coast regenerative braking. In the conventional method for controlling a motor torque in an electric vehicle, since the required regenerative braking torque and the coast regenerative braking torque are unsynchronized, a difference therebetween may cause a reduction in ride comfort.

SUMMARY

The present disclosure has been made to solve the above-mentioned problems occurring in the prior art while advantages achieved by the prior art are maintained intact.

An aspect of the present disclosure provides a method for controlling a motor torque in an electric vehicle, which is improved to prevent a sudden change in motor torque when a required regenerative braking torque is changed to a creep torque.

An aspect of the present disclosure also provides a method for controlling a motor torque in an electric vehicle, which is improved to synchronize a required regenerative braking torque with a coast regenerative braking torque.

An aspect of the present disclosure also provides a method for controlling a motor torque in an electric vehicle, which is improved to prevent a sudden change in motor torque when a creep torque is changed to a coast regenerative braking torque.

According to an aspect of the present disclosure, a method for controlling a motor torque in an electric vehicle includes the steps of: (a) determining a driving condition of the vehicle; (b) determining whether or not a predetermined limiting condition for a creep torque increase rate is satisfied when it is determined that the vehicle is decelerating in step (a); and (c) limiting the creep torque increase rate when the limiting condition for a creep torque increase rate is satisfied, and applying a creep torque of which the increase rate has been limited.

Step (a) may include measuring at least one of a brake pedal position value, an accelerator pedal position value, and a vehicle speed.

The limiting condition for a creep torque increase rate may be satisfied when the vehicle is in a regenerative braking mode and a vehicle speed is reduced to a vehicle speed for termination of regenerative braking or when the creep torque increase rate is already being limited.

The method may further include the steps of: (d) determining whether or not a predetermined condition for cancellation of limitation of the creep torque increase rate is satisfied when the creep torque increase rate is being limited; and (e) cancelling the limitation of the creep torque increase rate when the condition for cancellation is satisfied.

The condition for cancellation may be satisfied when a vehicle speed is increased to a vehicle speed for termination of regenerative braking, when an accelerator pedal position value is greater than a predetermined reference position value, or when the creep torque reaches a predetermined reference value.

The method may further include the steps of: (f) determining whether or not a predetermined condition for regenerative braking is satisfied when it is determined that the vehicle is decelerating; and (g) activating a regenerative braking when the condition for regenerative braking is satisfied, wherein step (f) may be performed between step (a) and step (b), and step (b) may be performed after step (g).

The condition for regenerative braking may be satisfied when a vehicle speed is higher than a predetermined vehicle speed for termination of regenerative braking.

Step (g) may include calculating a total regenerative braking torque using a required regenerative braking torque and a coast regenerative braking torque.

Step (g) may include performing synchronization of the required regenerative braking torque with the coast regenerative braking torque.

The synchronization may be performed to allow a vehicle speed for reduction of the required regenerative braking torque and a vehicle speed for reduction of the coast regenerative braking torque to correspond to each other.

The synchronization may be performed to allow a vehicle speed for termination of regenerative braking torque requirement and a vehicle speed for termination of coast regenerative braking to correspond to each other.

The method may further include the steps of: (h) determining whether or not a predetermined limiting condition for a coast regenerative braking torque increase rate is satisfied when it is determined that the vehicle is accelerating in step (a); and (i) limiting the coast regenerative braking torque increase rate when the limiting condition for a coast regenerative braking torque increase rate is satisfied, and activating a coast regenerative braking.

The limiting condition for a coast regenerative braking torque increase rate may be satisfied when the vehicle is in a creep driving mode and a vehicle speed is increased to a vehicle speed for termination of creep driving or when the coast regenerative braking torque increase rate is already being limited.

The method may further include the steps of: (j) determining whether or not a predetermined condition for cancellation of limitation of the coast regenerative braking torque increase rate is satisfied when the coast regenerative braking torque increase rate is being limited; and (k) cancelling the limitation of the coast regenerative braking torque increase rate when the condition for cancellation is satisfied.

The condition for cancellation may be satisfied when a vehicle speed is reduced to a vehicle speed for termination of creep driving or when the coast regenerative braking torque reaches a predetermined reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
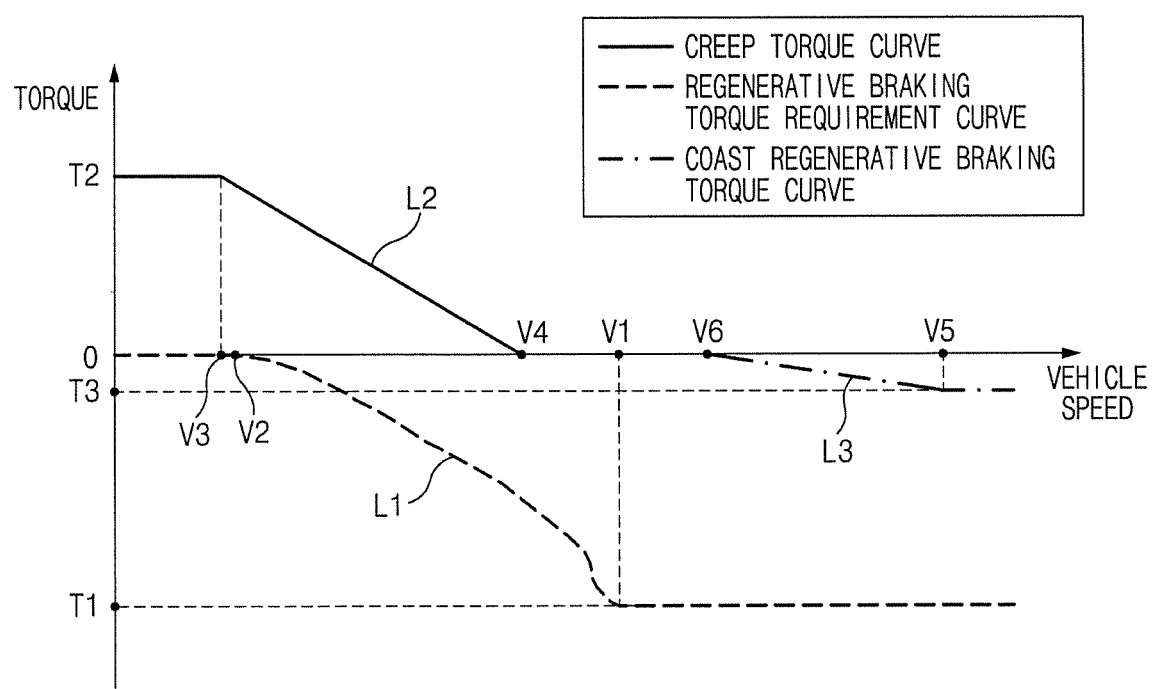
FIG. 1 shows a graph illustrating a regenerative braking torque requirement curve, a creep torque curve, and a coast regenerative braking torque curve, in a method for controlling a motor torque in an electric vehicle according to the related art.

Hereinafter, exemplary embodiments of the present disclosure will be described in detail with reference to the accompanying drawings. Terms or words used in the present specification and claims should not be interpreted as being limited to accepted meanings or dictionary definitions, but should be interpreted as having meanings and concepts that comply with the technical ideas of the present disclosure based on the principle by which an inventor can appropriately define the concepts of the terms or words in order to describe the invention in the best way. Therefore, the embodiments described in the specification and the configuration of elements illustrated in the drawings are merely considered to be preferred embodiments and do not represent all the technical ideas of the present disclosure, and thus it should be understood that various equivalents and modifications may exist at the time of filing this application.

In the drawings, the shapes and dimensions of elements or portions of the elements may be exaggerated or schematically illustrated for convenience of explanation and clarity. In addition, a detailed description of a related known function or configuration will be ruled out in order not to unnecessarily obscure the gist of the present disclosure.

Figure 3:
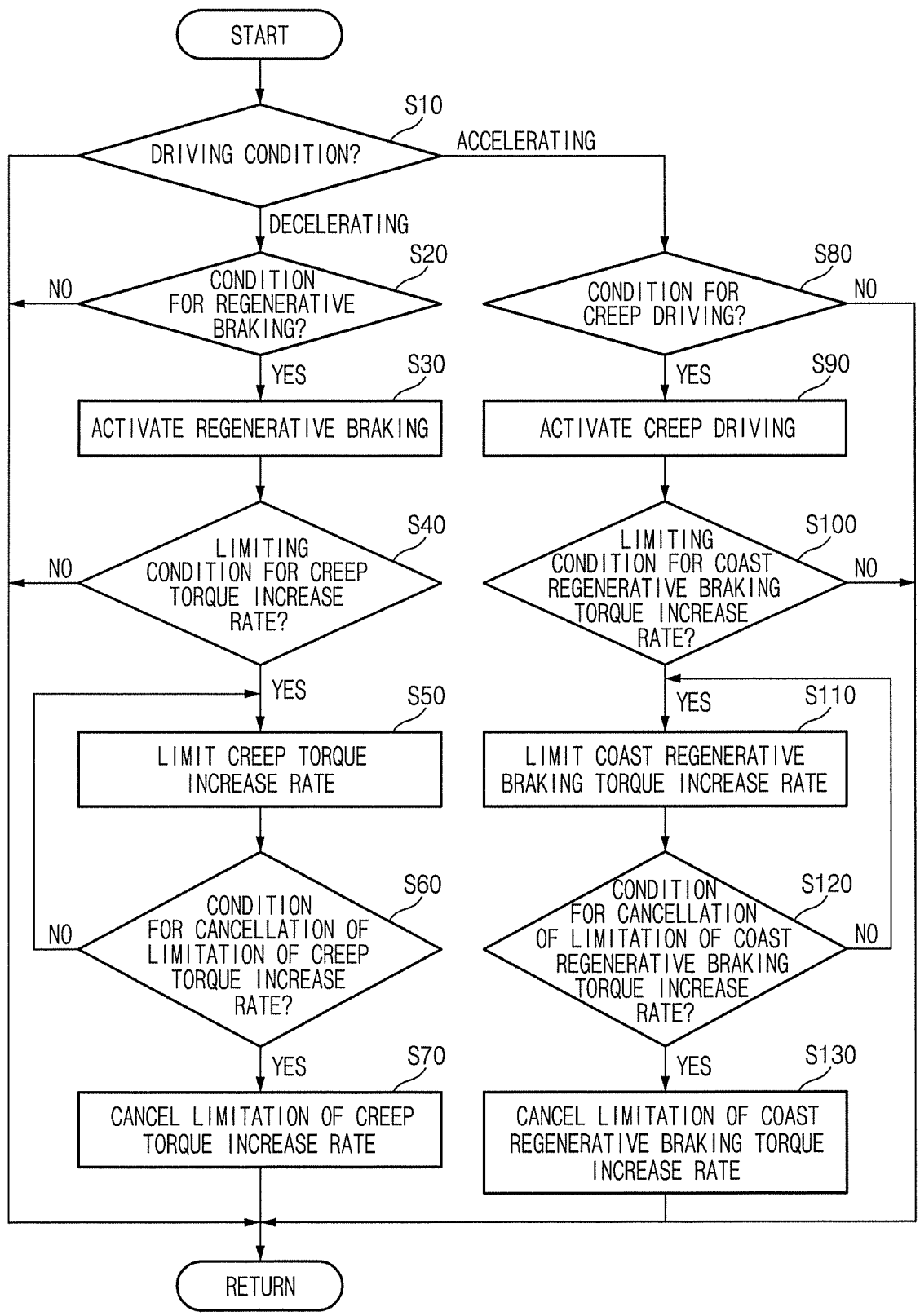
FIG. 3 shows a flowchart illustrating a method for controlling a motor torque in an electric vehicle according to an exemplary embodiment of the present disclosure.
Figure 4:
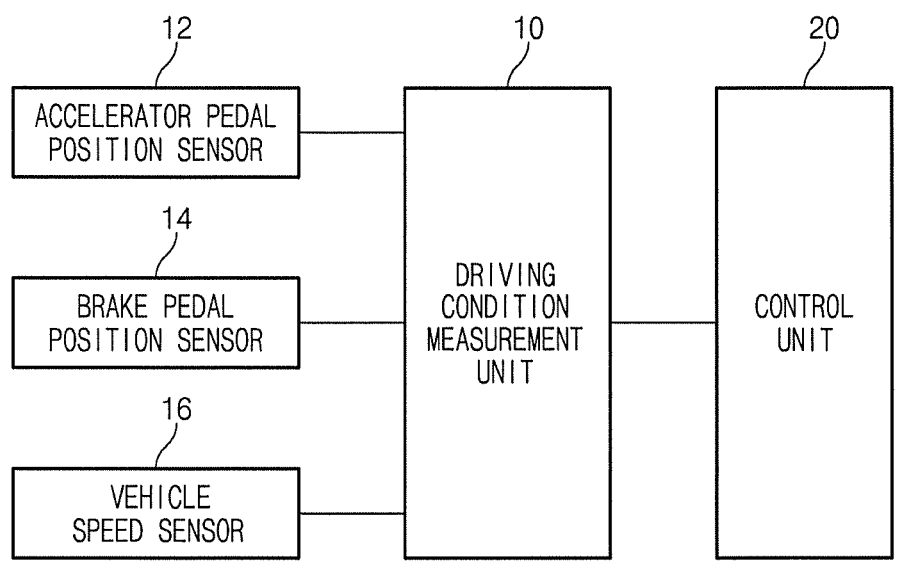
FIG. 4 shows a block diagram illustrating a control system of an electric vehicle to which the method for controlling a motor torque in an electric vehicle illustrated in FIG. 3 is applied.

FIG. 3 shows a flowchart illustrating a method for controlling a motor torque in an electric vehicle according to an exemplary embodiment of the present disclosure, and FIG. 4 shows a block diagram illustrating a control system of an electric vehicle to which the method for controlling a motor torque in an electric vehicle illustrated in FIG. 3 is applied.

Referring to FIG. 3, the method for controlling a motor torque in an electric vehicle, according to the exemplary embodiment of the present disclosure, includes: determining driving conditions of the vehicle in step S10; determining whether or not conditions for regenerative braking are satisfied in step S20; activating the regenerative braking in step S30; determining whether or not limiting conditions for the rate of increase in creep torque (hereinafter also referred to as the "creep torque increase rate") are satisfied in step S40; limiting the creep torque increase rate and applying a creep torque of which the increase rate has been limited in step S50; determining whether or not conditions for cancellation of limitation of the creep torque increase rate are satisfied in step S60; and cancelling the limitation of the creep torque increase rate in step S70.

Throughout this specification, a motor torque is a torque that is substantially output from a drive motor and is calculated in consideration of torque control factors such as a required regenerative braking torque, a creep torque, and a coast regenerative braking torque.

Figure 2:
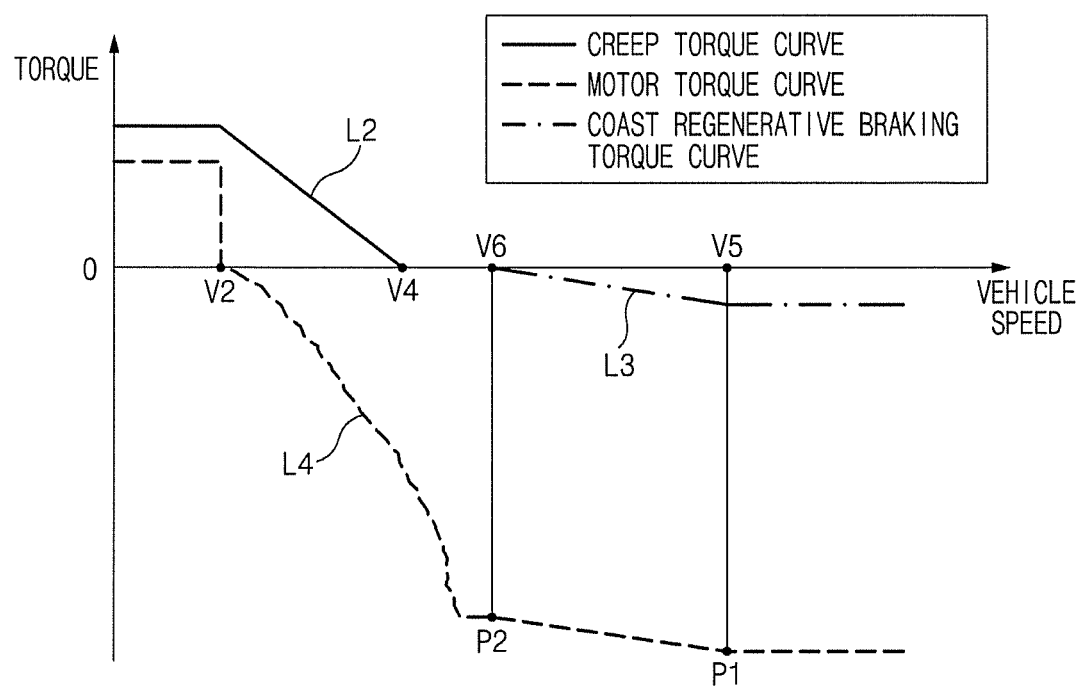
FIG. 2 shows a graph illustrating a motor torque curve when braking a vehicle, in a method for controlling a motor torque in an electric vehicle according to the related art.

For convenience of explanation, hereinafter, the reference numerals which are the same as those illustrated in FIGS. 1 and 2 will be used to designate the elements which are the same as those illustrated in FIGS. 1 and 2.

First of all, in step S10, data related to driving conditions of a vehicle may be collected using a driving condition measurement unit 10 and the data related to the driving conditions may be analyzed using a controller 20. The controller 20 is an electric circuitry which performs various functions described below with execution of instructions embedded thereon.

As illustrated in FIG. 4, the driving condition measurement unit 10 may be provided with an accelerator pedal position sensor 12, a brake pedal position sensor 14, and a vehicle speed sensor 16.

The accelerator pedal position sensor 12 may measure an accelerator pedal position value (the degree of an accelerator pedal being depressed) and transmit a signal corresponding thereto to the controller 20. When the accelerator pedal is fully depressed, the accelerator pedal position value is 100%, and when the accelerator pedal is not depressed (the accelerator pedal is off), the accelerator pedal position value is 0%.

The brake pedal position sensor 14 may measure a brake pedal position value (the degree of a brake pedal being depressed) and transmit a signal corresponding thereto to the controller 20. When the brake pedal is fully depressed, the brake pedal position value is 100%, and when the brake pedal is not depressed (the brake pedal is off), the brake pedal position value is 0%.

The vehicle speed sensor 16 may measure the speed of the vehicle and transmit a signal corresponding thereto to the controller 20. The vehicle speed sensor 16 may be mounted on wheels of the vehicle, but is not limited thereto.

The controller 20 may process a series of control commands to perform a method for controlling a motor torque in an electric vehicle according to exemplary embodiments of the present disclosure. The controller 20 may analyze the data related to the driving conditions from the driving condition measurement unit 10 to determine the driving conditions of the vehicle.

For example, the controller 20 may determine that the vehicle is decelerating when the brake pedal position value is higher than a predetermined reference position value.

For example, the controller 20 may determine that the vehicle is accelerating when the vehicle speed measured by the vehicle speed sensor 16 is increased.

Figure 5:
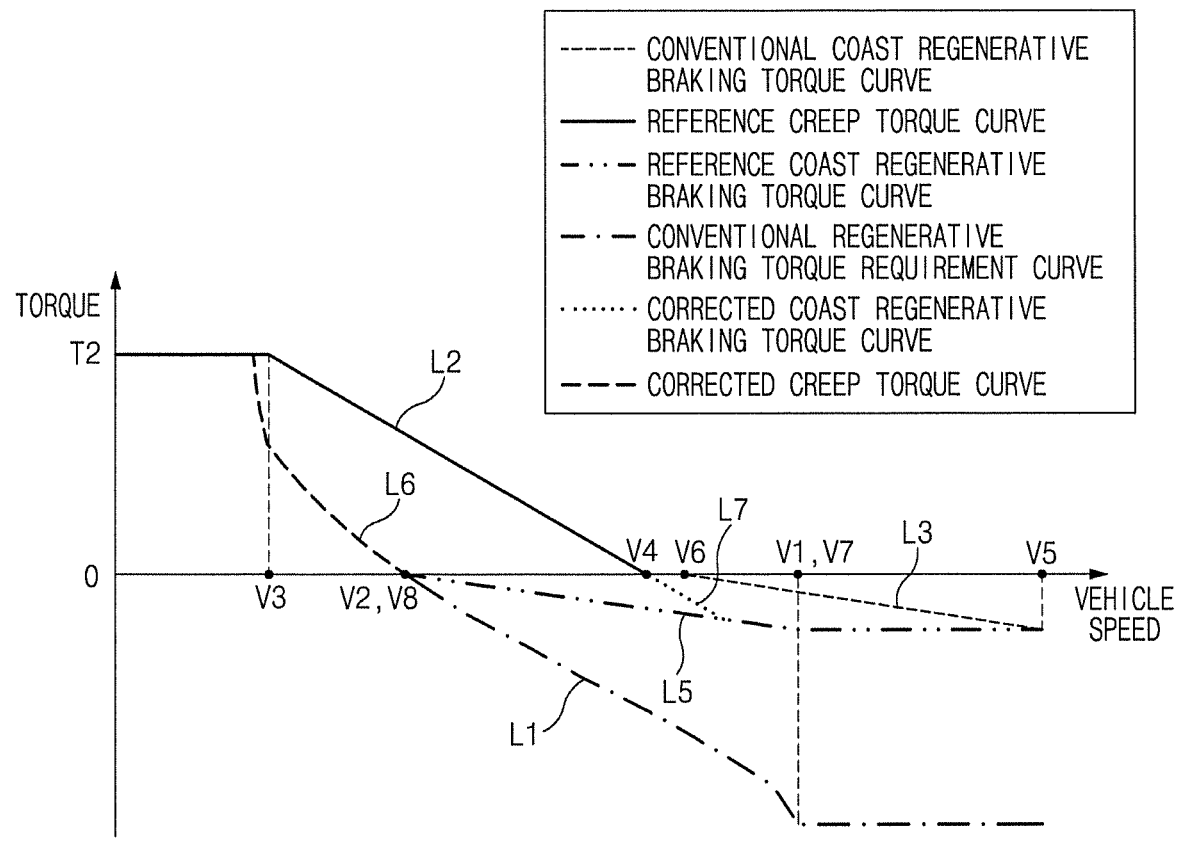
FIG. 5 shows a graph illustrating a regenerative braking torque requirement curve, a creep torque curve, and a coast regenerative braking torque curve, in the method for controlling a motor torque in an electric vehicle illustrated in FIG. 3.
Figure 6:
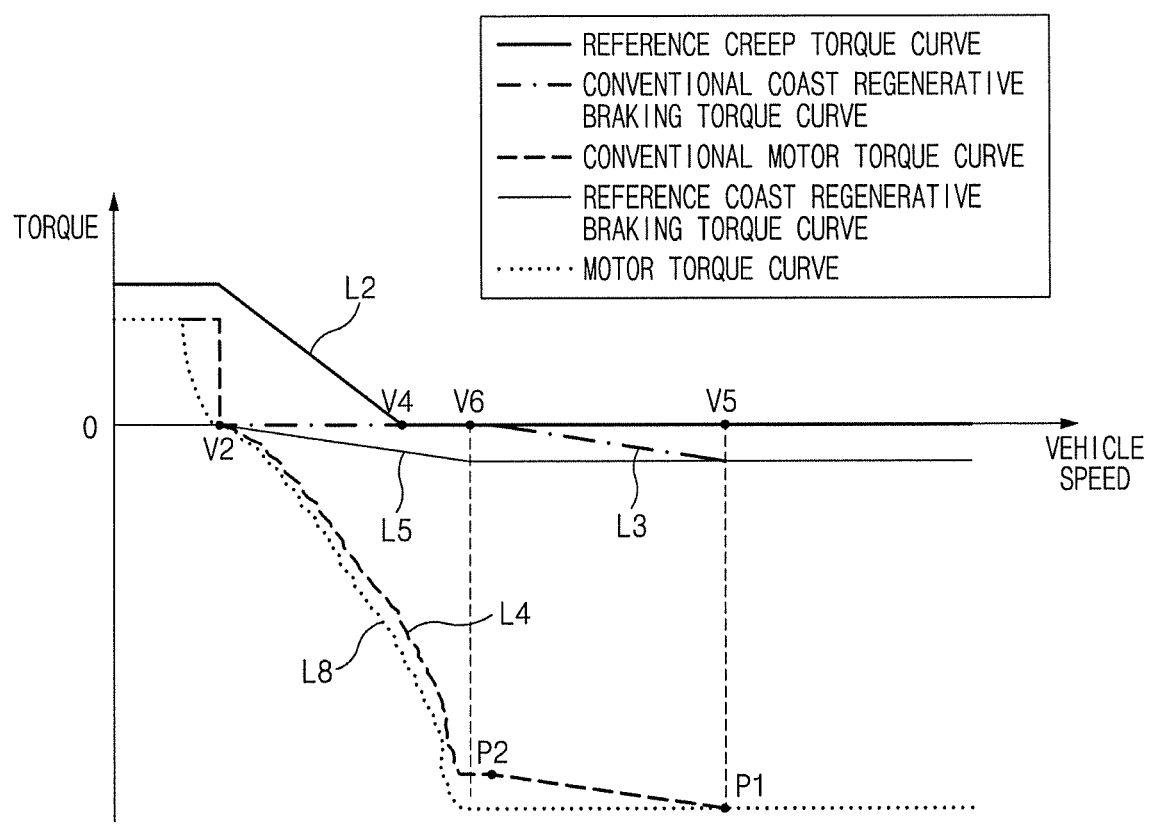
FIG. 6 shows a graph illustrating a motor torque curve when braking a vehicle, in the method for controlling a motor torque in an electric vehicle illustrated in FIG. 3.

FIG. 5 shows a graph illustrating a regenerative braking torque requirement curve, a creep torque curve, and a coast regenerative braking torque curve, in the method for controlling a motor torque in an electric vehicle illustrated in FIG. 3, and FIG. 6 shows a graph illustrating a motor torque curve when braking a vehicle, in the method for controlling a motor torque in an electric vehicle illustrated in FIG. 3.

In FIG. 5, an X-axis represents a speed of a vehicle, a positive Y-axis represents a creep torque, a negative Y-axis represents a regenerative braking torque required and a coast regenerative braking torque, an upward movement along the positive Y-axis represents an increase in creep torque, and a downward movement along the negative Y-axis represents an increase in regenerative braking torque required and coast regenerative braking torque.

In FIG. 6, an X-axis represents a speed of a vehicle, a positive Y-axis represents a creep torque and a positive motor torque, a negative Y-axis represents a regenerative braking torque required, a coast regenerative braking torque, and a negative motor torque, an upward movement along the positive Y-axis represents an increase in creep torque and positive motor torque, and a downward movement along the negative Y-axis represents an increase in regenerative braking torque required, coast regenerative braking torque, and negative motor torque.

Next, when it is determined that the vehicle is decelerating in step S10, the controller 20 may determine whether or not predetermined conditions for regenerative braking are satisfied in step S20. The conditions for regenerative braking refer to conditions for determining whether to activate the regenerative braking. For example, when it is determined that the vehicle is decelerating and the vehicle speed is higher than a predetermined vehicle speed V2 for termination of regenerative braking torque requirement, the controller 20 may determine that the conditions for regenerative braking are satisfied.

Thereafter, when it is determined that the conditions for regenerative braking are satisfied in step S20, the regenerative braking may be activated on the basis of a regenerative braking torque calculated using the controller 20 in step S30.

The regenerative braking torque may be divided into a required regenerative braking torque and a coast regenerative braking torque. Therefore, the controller 20 may calculate the required regenerative braking torque according to a reference regenerative braking torque requirement curve L1 and calculate the coast regenerative braking torque according to a reference coast regenerative braking torque curve L5 as illustrated in FIG. 5, and may activate the regenerative braking on the basis of the calculated required regenerative braking torque and the calculated coast regenerative braking torque.

The reference regenerative braking torque requirement curve L1 and the reference coast regenerative braking torque curve L5 may be synchronized to allow at least one of vehicle speeds V1 and V7 and vehicle speeds V2 and V8 to correspond to each other, as illustrated in FIG. 5. The reference coast regenerative braking torque curve L5 may be changed on the basis of the reference regenerative braking torque requirement curve L1 to allow the vehicle speed V7 for reduction of the coast regenerative braking torque and the vehicle speed V8 for termination of coast regenerative braking to correspond to the vehicle speed V1 for reduction of the required regenerative braking torque and the vehicle speed V2 for termination of regenerative braking torque requirement, respectively, but the synchronization is not limited thereto.

Unlike the conventional motor torque curve L4 including the inflection points P1 and P2 due to the unsynchronized problem of the required regenerative braking torque and the coast regenerative braking torque, a motor torque curve L8 without the inflection points may be derived by synchronizing the required regenerative braking torque with the coast regenerative braking torque, as illustrated in FIG. 6. Therefore, the method for controlling a motor torque in an electric vehicle according to the exemplary embodiment of the present disclosure may prevent a difference due to the unsynchronized problem of the required regenerative braking torque and the coast regenerative braking torque, thereby improving ride comfort. In addition, the method for controlling a motor torque in an electric vehicle according to the exemplary embodiment of the present disclosure may activate the coast regenerative braking until the vehicle speed reaches the vehicle speed V2 for termination of regenerative braking torque requirement, thereby increasing an activation region of the coast regenerative braking to improve fuel efficiency.

Meanwhile, when it is determined that the conditions for regenerative braking are not satisfied in step S20, step S10 may be performed again, as illustrated in FIG. 3.

For convenience of explanation, hereinafter, the vehicle speed V2 for termination of regenerative braking torque requirement and the vehicle speed V8 for termination of coast regenerative braking may be referred to as the vehicle speed V2 for termination of regenerative braking.

Then, when the vehicle is in a regenerative braking mode, the controller 20 may determine whether or not predetermined limiting conditions for a creep torque increase rate are satisfied in step S40. The limiting conditions for a creep torque increase rate refer to conditions for limiting the rate of increase in creep torque when applying the creep torque.

For example, when the vehicle is in the regenerative braking mode and the vehicle speed is reduced to the vehicle speed V2 for termination of regenerative braking such that the regenerative braking is terminated, the controller 20 may determine that the limiting conditions for a creep torque increase rate are satisfied.

For example, when the creep torque increase rate is already being limited, the controller 20 may determine that the limiting conditions for a creep torque increase rate are satisfied.

Thereafter, when it is determined that that the limiting conditions for a creep torque increase rate are satisfied in step S40, a creep torque of which the increase rate has been limited may be output in step S50.

According to a reference creep torque curve L2 which is applied during the creep driving, as illustrated in FIG. 5, the vehicle speed V4 for termination of creep driving may be higher than the vehicle speed V2 for termination of regenerative braking. When the creep torque is output according to the reference creep torque curve L2, an overlapping region in which a positive torque command and a negative torque command coexist may appear in a section between the vehicle speed V4 for termination of creep driving and the vehicle speed V2 for termination of regenerative braking. Therefore, if the regenerative braking torque is selectively applied to the overlapping region by prioritizing the regenerative braking torque for safety, when the vehicle speed is reduced to the vehicle speed V2 for termination of regenerative braking and the regenerative braking is terminated, a creep torque on the reference creep torque curve L2, corresponding to the vehicle speed V2 for termination of regenerative braking, may be suddenly applied, and thus a motor torque may be suddenly changed. Such a sudden change in motor torque may cause a shock in a drive system of the vehicle, thereby causing a reduction in ride comfort.

To solve this problem, as illustrated in FIG. 5, when the limiting conditions for a creep torque increase rate are satisfied, the creep torque may be applied according to a corrected creep torque curve L6. The corrected creep torque curve L6 refers to a corrected curve by which the creep torque increase rate is limited when the regenerative braking torque is changed to the creep torque. The corrected creep torque curve L6 may be provided, as illustrated in FIG. 5, such that the creep torque may be 0 at the vehicle speed V2 for termination of regenerative braking and may be gradually increased as the vehicle speed is decreased.

According to the corrected creep torque curve L6, as illustrated in FIG. 6, when the vehicle is in the regenerative braking mode and the vehicle speed is reduced to the vehicle speed V2 for termination of regenerative braking, the motor torque curve L8 that is corrected by allowing the motor torque to be gradually increased compared to the conventional motor torque curve L4 may be derived. Therefore, the method for controlling a motor torque in an electric vehicle according to the exemplary embodiment of the present disclosure may prevent a shock that may occur in the drive system of the vehicle due to a sudden change in motor torque when the regenerative braking torque is changed to the creep torque, thereby improving ride comfort.

Meanwhile, when it is determined that the limiting conditions for a creep torque increase rate are not satisfied, step S10 may be performed again as illustrated in FIG. 3.

Then, when the creep torque increase rate is being limited, the controller 20 may determine whether or not predetermined conditions for cancellation of limitation of the creep torque increase rate are satisfied in step S60. The conditions for cancellation of limitation of the creep torque increase rate refer to conditions for determining whether to cancel the limitation of the creep torque increase rate.

For example, when the creep torque increase rate is being limited and the vehicle speed is increased to the vehicle speed V2 for termination of regenerative braking such that the application of the creep torque is terminated, the controller 20 may determine that the conditions for cancellation of limitation of the creep torque increase rate are satisfied.

Figure 7:
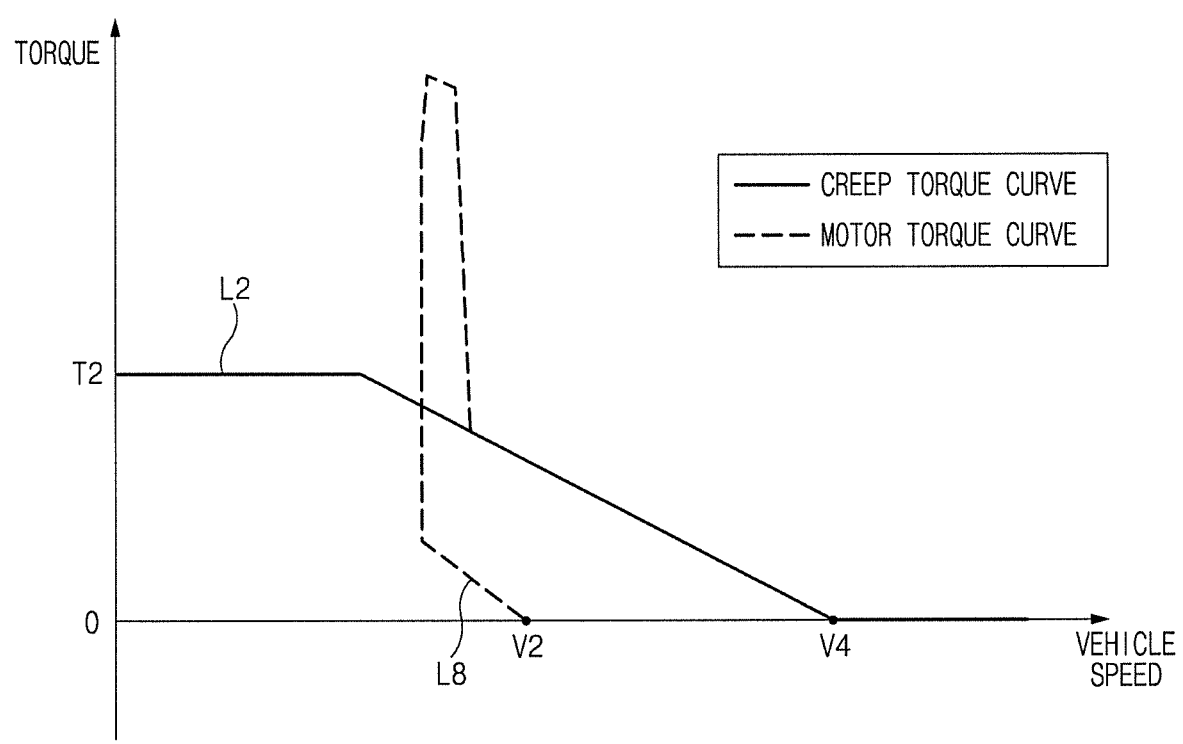
FIG. 7 shows a graph illustrating the cancellation of limitation of a creep torque increase rate, in the method for controlling a motor torque in an electric vehicle illustrated in FIG. 3.

For example, as illustrated in FIG. 7, when the creep torque increase rate is being limited and the accelerator pedal position value is greater than a predetermined reference position value such that the motor torque is increased, the controller 20 may determine that the conditions for cancellation of limitation of the creep torque increase rate are satisfied.

For example, when the creep torque increase rate is being limited and the creep torque reaches a predetermined reference value, the controller 20 may determine that the conditions for cancellation of limitation of the creep torque increase rate are satisfied. The reference value for the creep torque may be the maximum creep torque T2 on the reference creep torque curve L2 as illustrated in FIG. 5, but is not limited thereto.

Thereafter, when it is determined that the conditions for cancellation of limitation of the creep torque increase rate are satisfied in step S60, the creep torque may be output according to the reference creep torque curve L2 in step S70.

Meanwhile, when it is determined that the conditions for cancellation of limitation of the creep torque increase rate are not satisfied in step S60, step S50 may be performed again as illustrated in FIG. 3.

Meanwhile, the method for controlling a motor torque in an electric vehicle, according to the exemplary embodiment of the present disclosure, includes: determining whether or not conditions for creep driving are satisfied in step S80; activating the creep driving in step S90; determining whether or not limiting conditions for the rate of increase in coast regenerative braking torque (hereinafter also referred to as the "coast regenerative braking torque increase rate") are satisfied in step S100; limiting the coast regenerative braking torque increase rate and activating the coast regenerative braking in step S110; determining whether or not conditions for cancellation of limitation of the coast regenerative braking torque increase rate are satisfied in step S120; and cancelling the limitation of the coast regenerative braking torque increase rate in step S130.

First of all, when it is determined that the vehicle is accelerating in step S10, the controller 20 may determine whether or not conditions for creep driving are satisfied in step S80. The conditions for creep driving refer to conditions for determining whether to activate the creep driving. For example, when it is determined that the vehicle is accelerating and the vehicle speed is lower than or equal to the predetermined vehicle speed V4 for termination of creep driving while the vehicle is running with the accelerator pedal off and the brake pedal off, the controller 20 may determine that the conditions for creep driving are satisfied.

Next, when it is determined that the conditions for creep driving are satisfied in step S80, the creep torque may be output according to the reference creep torque curve L2 as illustrated in FIG. 5 in step S90.

Thereafter, when the vehicle is in a creep driving mode, the controller 20 may determine whether or not limiting conditions for a coast regenerative braking torque increase rate are satisfied in step S100. The limiting conditions for a coast regenerative braking torque increase rate refer to conditions for limiting the rate of increase in coast regenerative braking torque to activate the coast regenerative braking.

For example, when the vehicle is in the creep driving mode and the vehicle speed is increased to the vehicle speed V4 for termination of creep driving such that the creep driving is terminated, the controller 20 may determine that the limiting conditions for a coast regenerative braking torque increase rate are satisfied.

For example, when the coast regenerative braking torque increase rate is already being limited, the controller 20 may determine that the limiting conditions for a coast regenerative braking torque increase rate are satisfied.

Then, when it is determined that the limiting conditions for a coast regenerative braking torque increase rate are satisfied in step S100, the coast regenerative braking may be activated according to a corrected coast regenerative braking torque curve L7 in step S110. The coast regenerative braking may be activated when the vehicle speed is higher than the vehicle speed V4 for termination of creep driving while the vehicle is running with the accelerator pedal off and the brake pedal off.

Referring to FIG. 5, when the vehicle speed is equal to the vehicle speed V4 for termination of creep driving, a predetermined gap may be present between the reference creep torque curve L2 and the reference coast regenerative braking torque curve L5. Thus, when the creep torque is applied according to the reference creep torque curve L2 and then the coast regenerative braking is activated at the vehicle speed V4 for termination of creep driving according to the reference coast regenerative braking torque curve L5, the motor torque may be suddenly changed. In other words, when the vehicle is in the creep driving mode and the vehicle speed is increased to the vehicle speed V4 for termination of creep driving such that the creep driving is terminated, a coast regenerative braking torque on the reference coast regenerative braking torque curve L5, corresponding to the vehicle speed V4 for termination of creep driving, may be suddenly applied, and thus the motor torque may be suddenly changed. Such a sudden change in motor torque may cause a shock in the drive system of the vehicle, thereby causing a reduction in ride comfort.

To solve this problem, as illustrated in FIG. 5, when the vehicle is in the creep driving mode and the vehicle speed is increased to the vehicle speed V4 for termination of creep driving such that the creep driving is terminated, the coast regenerative braking torque may be applied according to the corrected coast regenerative braking torque curve L7. The corrected coast regenerative braking torque curve L7 refers to a corrected curve by which the coast regenerative braking torque increase rate is limited. The corrected coast regenerative braking torque curve L7 may be provided, as illustrated in FIG. 5, such that the coast regenerative braking torque may be 0 at the vehicle speed V4 for termination of creep driving and may be gradually increased as the vehicle speed is increased.

According to the corrected coast regenerative braking torque curve L7, a sudden change in motor torque may be prevented even when the vehicle is in the creep driving mode and the vehicle speed is increased to the vehicle speed V4 for termination of creep driving. Therefore, the method for controlling a motor torque in an electric vehicle according to the exemplary embodiment of the present disclosure may prevent a shock that may occur in the drive system of the vehicle due to a sudden change in motor torque when the creep torque is changed to the coast regenerative braking torque, thereby improving ride comfort.

Thereafter, when the coast regenerative braking torque increase rate is being limited, the controller 20 may determine whether or not predetermined conditions for cancellation of limitation of the coast regenerative braking torque increase rate are satisfied in step S120. The conditions for cancellation of limitation of the coast regenerative braking torque increase rate refer to conditions for determining whether to cancel the limitation of the coast regenerative braking torque increase rate.

For example, when the coast regenerative braking torque increase rate is being limited and the vehicle speed is reduced to the vehicle speed V4 for termination of creep driving, the controller 20 may determine that the conditions for cancellation of limitation of the coast regenerative braking torque increase rate are satisfied.

For example, when the coast regenerative braking torque increase rate is being limited and the coast regenerative braking torque reaches a predetermined reference value, the controller 20 may determine that the conditions for cancellation of limitation of the coast regenerative braking torque increase rate are satisfied. The reference value for the coast regenerative braking torque may be a coast regenerative braking torque corresponding to a vehicle speed at which the reference coast regenerative braking torque curve L5 and the corrected coast regenerative braking torque curve L7 meet as illustrated in FIG. 5, but is not limited thereto.

Then, when it is determined that the conditions for cancellation of limitation of the coast regenerative braking torque increase rate are satisfied in step S120, the coast regenerative braking may be activated according to the reference coast regenerative braking torque curve L5 in step S130.

The method for controlling a motor torque in an electric vehicle, according to the exemplary embodiments of the present disclosure, may have the following effects:

First, the present inventive concept may prevent a shock that may occur in the drive system of the vehicle due to a sudden change in motor torque when the required regenerative braking torque is changed to the creep torque, thereby improving ride comfort.

Second, the present inventive concept may prevent a shock that may occur in the drive system of the vehicle due to a sudden change in motor torque when the creep torque is changed to the coast regenerative braking torque, thereby improving ride comfort.

Third, the present inventive concept may increase a region available for the activation of the coast regenerative braking, thereby improving fuel efficiency.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a motor torque in an electric vehicle, the method comprising the steps of:
   (a) determining, by a processor, a driving condition of the vehicle;
   (b) determining, by the processor, whether or not a predetermined limiting condition for a creep torque increase rate is satisfied when it is determined that the vehicle is decelerating in step (a);
   (c) limiting, by the processor, the creep torque increase rate when the limiting condition for a creep torque increase rate is satisfied, and applying a creep torque of which the increase rate has been limited;
   (d) determining, by the processor, whether or not a predetermined condition for cancellation of limitation of the creep torque increase rate is satisfied when the creep torque increase rate is being limited; and
   (e) cancelling, by the processor, the limitation of the creep torque increase rate when the condition for cancellation is satisfied.

2. The method according to claim 1, wherein step (a) further comprises measuring at least one of a brake pedal position value, an accelerator pedal position value, and a vehicle speed.

3. The method according to claim 1, wherein the limiting condition for a creep torque increase rate is satisfied when the vehicle is in a regenerative braking mode and a vehicle speed is reduced to a vehicle speed for termination of regenerative braking or when the creep torque increase rate is already being limited.

4. The method according to claim 1, wherein the condition for cancellation is satisfied when a vehicle speed is increased to a vehicle speed for termination of regenerative braking, when an accelerator pedal position value is greater than a predetermined reference position value, or when the creep torque reaches a predetermined reference value.

5. The method according to claim 1, further comprising the steps of:
    (f) determining, by the processor, whether or not a predetermined condition for regenerative braking is satisfied when it is determined that the vehicle is decelerating; and
    (g) activating, by the processor, a regenerative braking when the condition for regenerative braking is satisfied,
    wherein step (f) is performed between step (a) and step (b), and
    step (b) is performed after step (g).

6. The method according to claim 5, wherein the condition for regenerative braking is satisfied when a vehicle speed is higher than a predetermined vehicle speed for termination of regenerative braking.

7. The method according to claim 5, wherein step (g) comprises calculating a total regenerative braking torque using a required regenerative braking torque and a coast regenerative braking torque.

8. The method according to claim 7, wherein step (g) comprises performing synchronization of the required regenerative braking torque with the coast regenerative braking torque.

9. The method according to claim 8, wherein the synchronization is performed to allow a vehicle speed for reduction of the required regenerative braking torque and a vehicle speed for reduction of the coast regenerative braking torque to correspond to each other.

10. The method according to claim 8, wherein the synchronization is performed to allow a vehicle speed for termination of regenerative braking torque requirement and a vehicle speed for termination of coast regenerative braking to correspond to each other.

11. The method according to claim 1, further comprising the steps of:
    (h) determining, by the processor, whether or not a predetermined limiting condition for a coast regenerative braking torque increase rate is satisfied when it is determined that the vehicle is accelerating in step (a); and
    (i) limiting, by the processor, the coast regenerative braking torque increase rate when the limiting condition for a coast regenerative braking torque increase rate is satisfied, and activating a coast regenerative braking.

12. The method according to claim 11, wherein the limiting condition for a coast regenerative braking torque increase rate is satisfied when the vehicle is in a creep driving mode and a vehicle speed is increased to a vehicle speed for termination of creep driving or when the coast regenerative braking torque increase rate is already being limited.

13. The method according to claim 11, further comprising the steps of:
    (j) determining, by the processor, whether or not a predetermined condition for cancellation of limitation of the coast regenerative braking torque increase rate is satisfied when the coast regenerative braking torque increase rate is being limited; and
    (k) cancelling, by the processor, the limitation of the coast regenerative braking torque increase rate when the condition for cancellation of the limitation of the coast regenerative braking torque increase rate is satisfied.

14. The method according to claim 13, wherein the condition for cancellation of the limitation of the coast regenerative braking torque increase rate is satisfied when a vehicle speed is reduced to a vehicle speed for termination of creep driving or when the coast regenerative braking torque reaches a predetermined reference value.

* * * * *